United States Patent [19]

Tanaka

[11] Patent Number: 5,406,383
[45] Date of Patent: Apr. 11, 1995

[54] METHOD AND APPARATUS FOR OUTPUTTING A PATTERN IN A SELECTED ONE OF A PLURALITY OF OUTPUT RESOLUTIONS

[75] Inventor: Fumihiro Tanaka, Yono, Japan

[73] Assignee: Canon Kabushiki Kaisha, Tokyo, Japan

[21] Appl. No.: 291,739

[22] Filed: Aug. 17, 1994

Related U.S. Application Data

[63] Continuation of Ser. No. 29,356, Mar. 10, 1993, which is a continuation of Ser. No. 752,276, Aug. 28, 1991.

[30] Foreign Application Priority Data

Sep. 3, 1990 [JP] Japan ................ 2-230602

[51] Int. Cl.⁶ .............. H04N 1/23; H04N 1/40
[52] U.S. Cl. ................ 358/401; 358/406; 358/448; 358/468; 358/296; 395/105; 395/109
[58] Field of Search .......... 358/296, 300, 406, 401, 358/448, 468, 486, 451, 452, 462, 501, 504, 530, 532, 537; 346/160, 108; 395/109, 105; 382/54, 55

[56] References Cited

U.S. PATENT DOCUMENTS 4,578,689 3/1986 Spencer et al. ............ 346/160
4,841,375 6/1989 Nakajima et al. .

OTHER PUBLICATIONS

Pat. Abs. Jp. vol. 14, No. 51, Jan. 30, 1990 & JP-A-1278169.
Pat. Abs. Jp. vol. 14, No. 38, Jan. 24, 1990 & JP-A-1270454.

*Primary Examiner*—Scott A. Rogers
*Attorney, Agent, or Firm*—Fitzpatrick, Cella, Harper & Scinto

[57] ABSTRACT

An output method and apparatus derive a plurality of respective time factors, each of which represents the time required to output a pattern in correspondence with a respective output resolution. The time factors are derived in response to data representing the pattern, and one of the output resolutions is selected for outputting the pattern in response to each of the plurality of respective derived time factors. As a result, the pattern can be output at the highest resolution possible in a set period of time.

55 Claims, 3 Drawing Sheets

METHOD AND APPARATUS FOR OUTPUTTING A PATTERN IN A SELECTED ONE OF A PLURALITY OF OUTPUT RESOLUTIONS

This application is a continuation of application Ser. No. 08/029,356, filed on Mar. 10, 1993, which is a continuation application of Ser. No. 07/752,276, filed on Aug. 28, 1991.

BACKGROUND OF THE INVENTION

1. Field of the Invention

The present invention relates to an output apparatus and, more particularly, to an output apparatus which can output at a plurality of resolutions.

2. Related Background Art

In such a kind of recording apparatus, generally, the user himself designates a recording resolution. The recording apparatus produces a print pattern (character pattern, graphic pattern, etc.) corresponding to the designated resolution.

In the above conventional example, therefore, in the case where the user wants to produce a printed matter in a short time, like a trial print of a printed matter, the resolution is first reduced to a proper value and print data is subsequently transmitted. In the above case, however, there are problems when the resolution is reduced to a lower value than is needed or the quality of the printed matter drops remarkably. Further, there is also the drawback that the resolution is reduced even when the print execution time is not so greatly influenced if the resolution is reduced.

SUMMARY OF THE INVENTION

The invention is made in consideration of the drawbacks in the conventional technique as mentioned above and it is an object of the invention to provide an output apparatus for executing optimum image recording in a desired time.

Another object of the invention is to provide an output apparatus which can output at a plurality of resolutions, wherein the apparatus comprises: designating means for designating a time which is required for an outputting process; time counting means for counting a presumed execution time for every resolution based on input print data; and setting means for setting the resolution upon outputting on the basis of the time value for each resolution which has been counted by the time counting means.

Still another object of the invention is to provide an output apparatus in which, when a time which is required for an outputting process is designated by designating means, a presumed execution time for outputting for each resolution based on received information to be generated is counted, one resolution is set on the basis of the result of the time counting, and image data is generated.

DETAILED DESCRIPTION OF THE PREFERRED EMBODIMENT

An embodiment according to the invention will be described in detail hereinbelow with reference to the drawings.

Figure 1:
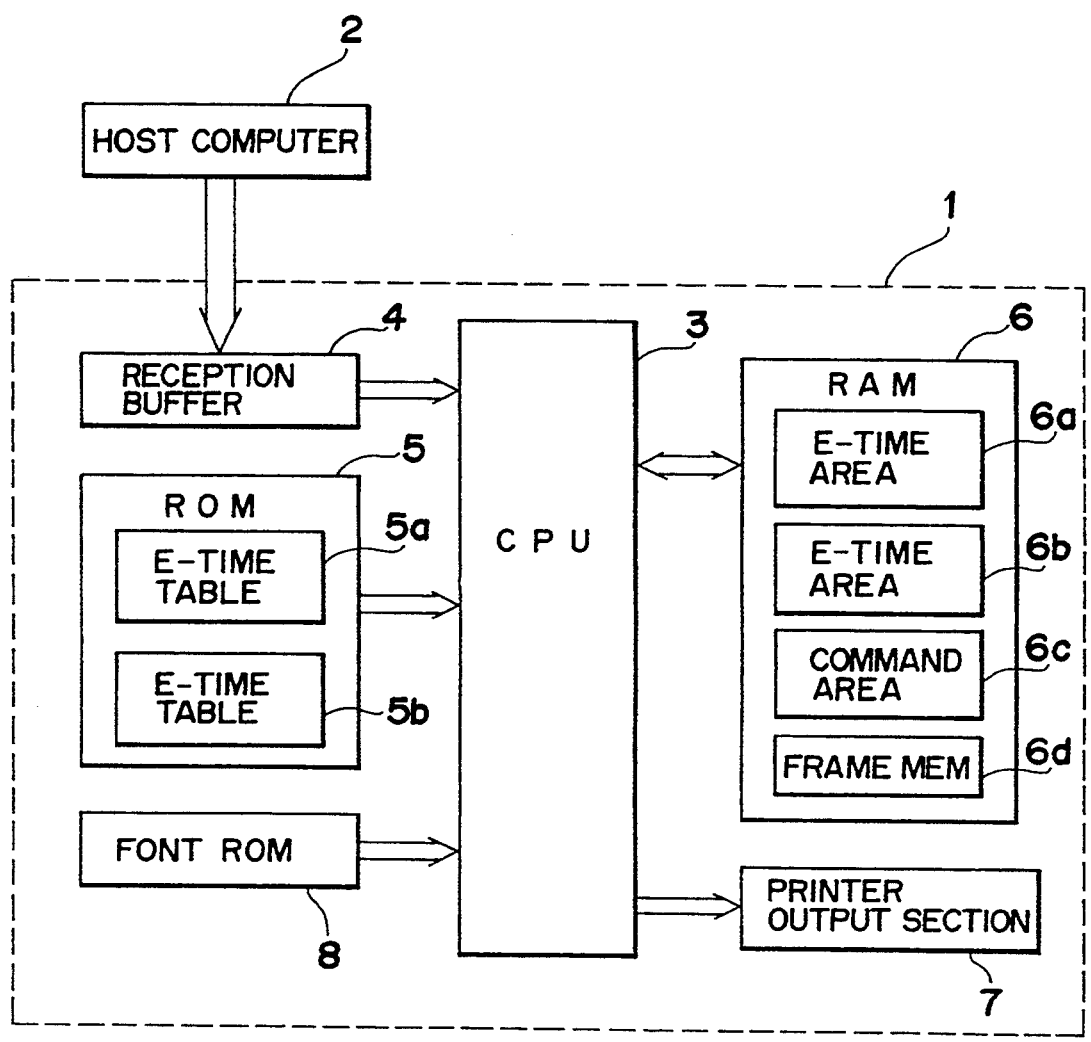
FIG. 1 is a block constructional diagram of a printer of an embodiment.

FIG. 1 is a block constructional diagram of a printer of the embodiment.

In the diagram, reference numeral 1 denotes a printer main body of the embodiment. The printer 1 can print at two high and low resolutions. Reference numeral 2 denotes a host computer to supply print data to the printer 1. The print data in the specification denotes a command train and it is assumed that a mode to print one character and a mode to draw a line are both instructed by each command. Reference numeral 3 denotes a CPU to control the whole printer; 4 a reception buffer to temporarily store data which is sent from the host computer 2; and 5 an ROM in which an operation processing procedure (refer to the flowchart of FIG. 2) of the CPU 3 has been stored. Execution-time tables 5a and 5b have been stored in the ROM 5. The relation between each command when the printing apparatus of the embodiment records at a high resolution and the execution time when the command has been executed are stored in the execution-time table 5a. The relation between each command at a low resolution and the execution time are stored in the execution-time table 5b. Reference numeral 6 denotes a RAM which is mainly used as a work area of the CPU 3. The RAM 6 has therein an execution-time calculation value memory area (for a high resolution) 6a, an execution-time calculation value memory area (for a low resolution) 6b, a command memory area 6c, and a frame memory 6d to develop image data of one page. The above execution-time is not limited to a value that is strictly a time. For instance, in the case of drawing a triangle of a figure to have a size of 12 inches, a time factor may be set to "10"or the like. In this manner, the execution-time may be represented by schematic information as mentioned above, and it is sufficient that such information has been stored in the above table. Various commands which have been supplied through the reception buffer 4 are stored in the command memory area 6c by corresponding to an amount of one page. The total value of the presumed times which will be required to execute each command in the case of a high resolution which have been obtained by referring to the execution-time table 5a is stored in the execution-time calculation value memory area 6a. Similarly, the total time of the execution times in the case of a low resolution which have been obtained by referring to the execution-time table 5b is stored in the execution-time calculation value memory area 6b. Reference numeral 7 denotes a printer output section to record an image developed in the frame memory 6d onto a recording medium (recording sheet). In the embodiment, the image is recorded at two resolutions. Reference numeral 8 denotes a font ROM in which data of the coordinates format to generate a character pattern or the like has been stored. Although its detailed description is omitted, as a method of generating a character pattern in the embodiment, an outline font method for generating a high fine character pattern irrespective of the size is used. When a diagram or the like is drawn, a drawing command indicative of such a drawing is analyzed and the diagram or the like is produced in the frame memory 6d.

A laser beam printer is used as a printer output section 7. A change in resolution is accomplished by changing a frequency of reference clocks when an image signal is supplied to a printer engine section (not shown) and a rotational speed of a polygon mirror. Since the principle of the image formation is based on the well-known electrophotographic technique, its detailed description is omitted here.

Figure 2:
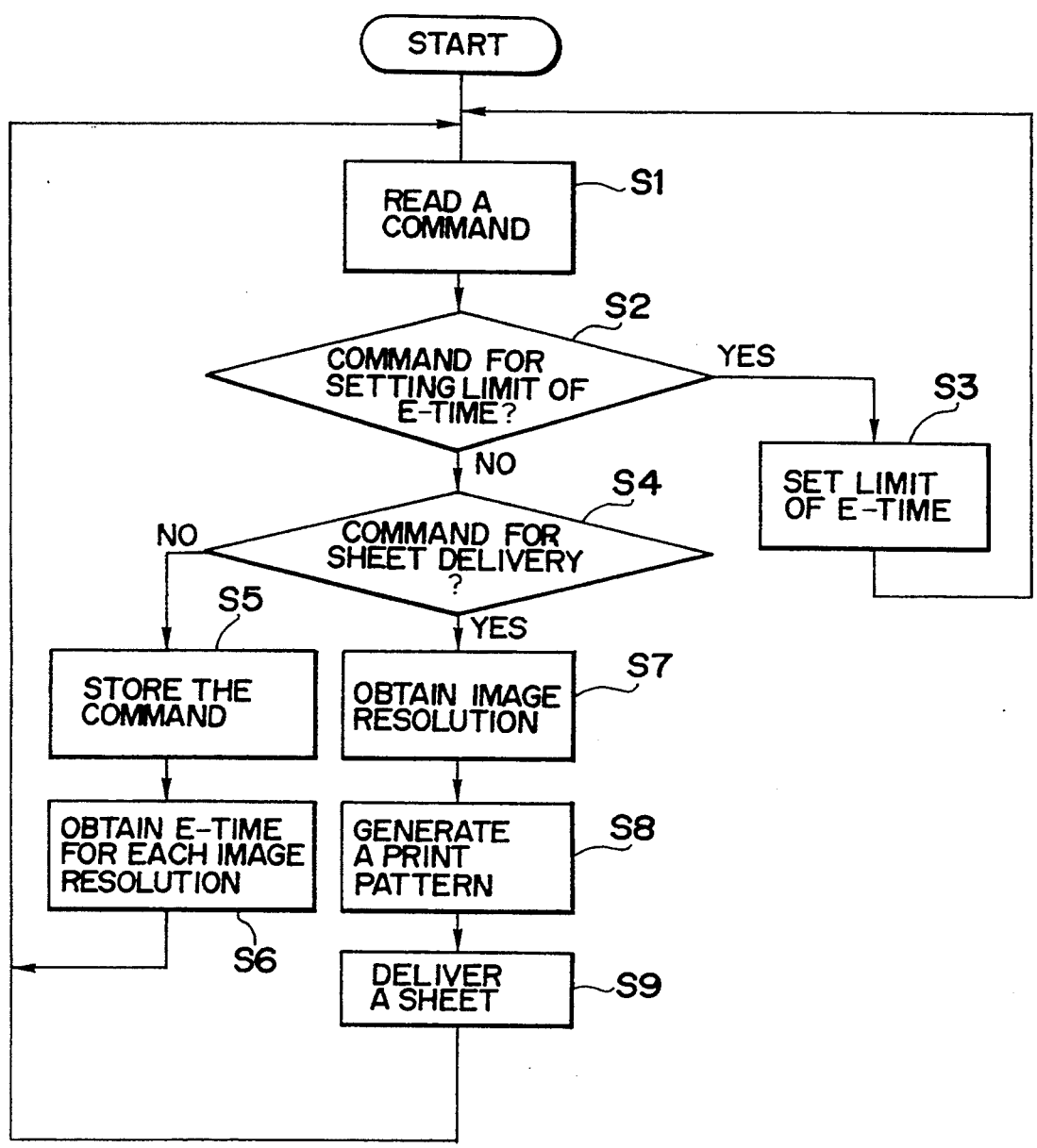
FIG. 2 is a flowchart showing an operation processing procedure in the embodiment.

The operation of the embodiment with the above structure will now be described with reference to a flowchart of FIG. 2.

First, in step S1, one command to the printer and parameters (set value for a set command and the like) associated with the command which have been sent from the host computer are read out of the reception buffer 4. In the next step S2, a check is made to see if the read command is a command to set a limit value of the execution-time or not. If YES, step S3 follows and the set data is stored at a special address position in the RAM 6. In the case of the printer of the embodiment, to raise the print processing speed, a limit time which is required for one recording sheet is set by the host computer 2. In the printer of the embodiment, if it is determined that a recording process at high resolution can be realized within the limit time, the recording is performed at high resolution. It is assumed that a practical absolute time is set as a limit time value. However, the limit time value can be also set by sensory levels such as "large, middle, small".

If it is determined in step S2 that the command is a command other than the execution-time limit value setting command, the processing routine advances to step S4 and a check is made to see if the data is a delivery command or not. If NO, it is decided that the data is a drawing command and step S5 follows. In step S5, the read command is stored into the command memory area 6c in the RAM 6. In the next step S6, the execution time of the command at each resolution is obtained by referring to the execution-time tables 5a and 5b and those execution times are stored into the execution-time calculation value memory areas 6a and 6b. By repetitively processing a loop which is branched from step S4 to step S5, the print commands are sequentially stored into the command memory area 6c. The total times which are required when executing the processes at respective resolutions are stored into the memory areas 6a and 6b.

If it is determined that the data fetched from the reception buffer 4 is the delivery command, the processing routine advances from step S4 to step S7. In step S7, on the basis of the total values (values stored in the memory areas 6a and 6b) of the execution times which have been calculated at respective resolutions and the set execution time limit value, the printer output section 7 is set so as to obtain the highest resolution among the resolutions at which the image data can be printed within the limit value. As already described above, the setting of the printer output section 7 is accomplished by changing the number of reference clocks of a pixel signal (video signal) output to the engine section of the laser beam printer and the rotational speed of the polygon mirror. After that, the processing routine advances to step S8, the command stored in the command memory area 6c is analyzed and a figure or the like is drawn in the frame memory 6d in accordance with the analyzed command. At this time, it is needless to say that a drawing process is executed on the basis of the resolution which has already been decided before. After the image data of one page is produced in the frame memory 6d, the printing process is actually started in step S9 and the printed sheet is delivered to the outside. To print the next page, the processing routine is returned to step S1. When a power source of the printing apparatus is turned on and if the sheet delivery process has been executed in step S9, the contents in the execution-time calculation value memory areas 6a and 6b are cleared to 0.

As described above, according to the embodiment, it is possible to print at the highest resolution at which image data can be printed within this limit value of the execution time, so that an image of highest quality can be reproduced within the time required by the operator.

In the above embodiment, the execution time has been limited on a page unit basis of the print sheet. However, the execution time can be also limited for the entire print data (in this case, a command indicative of the end of print data is provided) consisting of a plurality of pages in a group. Further, the execution time can be also limited on a unit basis of a printing speed of one character.

Although the above embodiment has been described with respect to an example of an apparatus which can switch the resolution to two levels, the number of resolutions can be also set to three or more levels.

Although the above embodiment has been described with respect to a case of using the laser beam printer as the apparatus to execute the printing process, the invention is not limited to such an example. This is because the above embodiment can be also applied to any other recording system which can record an image at different resolutions.

Further, the print execution time can be also set by an operation panel which is provided for the apparatus.

As described above, according to the invention, since an image is printed at the highest resolution which can be reproduced within the set time, the drawback that the printing quality is excessively reduced by excessively decreasing the resolution is eliminated.

Figure 3:
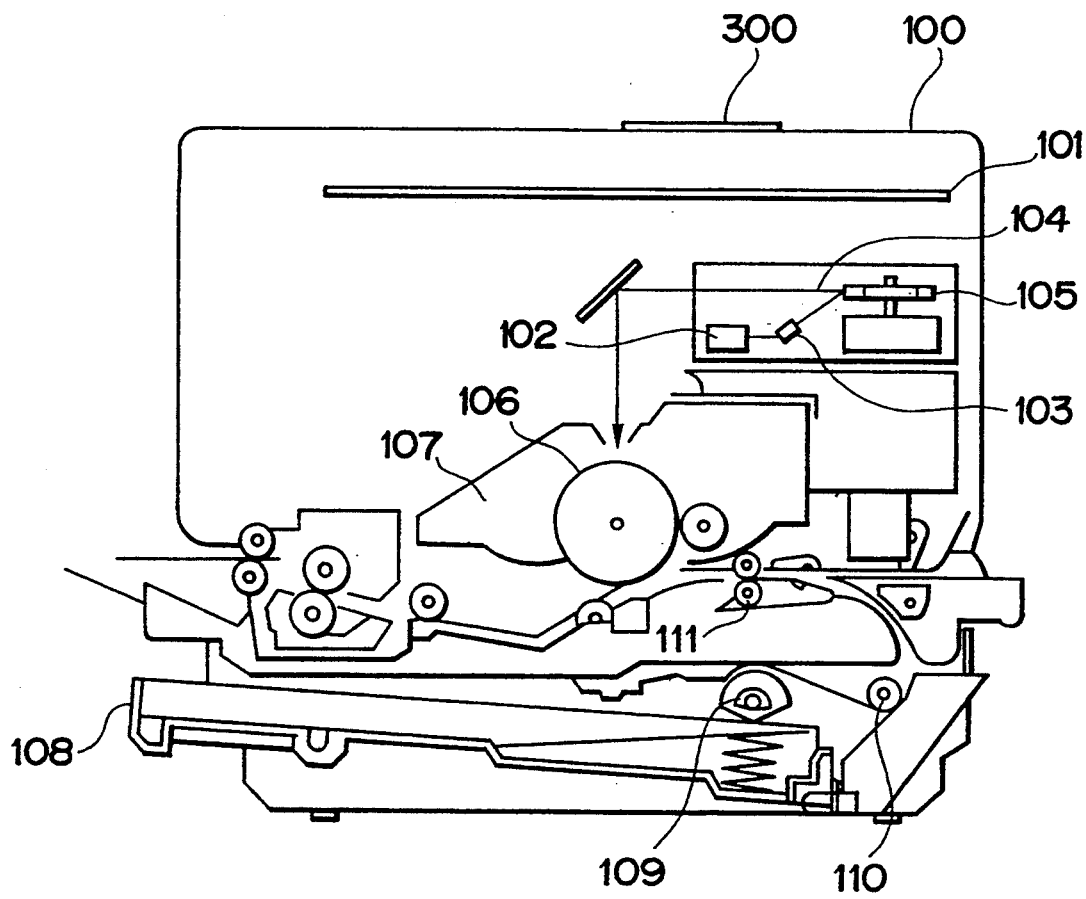
FIG. 3 is a diagram showing a structure of the printer.

FIG. 3 is a cross sectional view showing an internal structure of a laser beam printer (hereinafter, abbreviated to an LBP) as an example of the printer output section 7 in FIG. 1. The LBP can register a character pattern from a data source (not shown) and can register form data and the like.

In the diagram, reference numeral 100 denotes an LBP main body. Character data (character codes), form data, macro commands, etc. which are supplied from the host computer (2 in FIG. 1) connected to the outside are transmitted and stored into the LBP main body 100. In accordance with those data, the LBP 100 forms a corresponding character pattern, form pattern, or the like and forms an image onto a recording sheet as a recording medium. Reference numeral 300 denotes an operation panel in which switches to operate, an LED display, and the like are arranged. Reference numeral 101 denotes a printer control unit for controlling the whole LBP 100 and for analyzing character data or the like which is supplied from the host computer. The printer control unit 101 mainly converts the character data into the video signal of the corresponding character pattern and supplies to a laser driver 102.

The laser driver 102 is a circuit to drive a semiconductor laser 103 and switches the on/off operations of a laser beam 104 which is emitted from the semiconductor laser 103 in accordance with an input video signal. The laser beam 104 is oscillated to the right and left by a rotary polygon mirror 105 and scans on an electrostatic drum 106. Thus, an electrostatic latent image of a character pattern is formed on the drum 106. The latent image is developed by a developing unit 107 around the drum 106 and, thereafter, it is copy transferred onto the recording sheet. A cut sheet is used as a recording sheet. Cut recording sheets are enclosed in a sheet cassette 108 attached in the LBP 100 and are fed one by one into the apparatus by a feed roller 109 and conveying rollers 110 and 111. The recording sheet is subsequently conveyed to the drum 106.

What is claimed is:

1. An output method, comprising the steps of:
   deriving a time required to output a pattern based on data input;
   comparing the derived time with a predetermined time; and
   determining, in response to a comparison result obtained in said comparing step, whether the pattern can be output in a resolution corresponding to the predetermined time.

2. A method according to claim 1, wherein the data comprises a command for instructing drawing of a desired pattern.

3. A method according to claim 1, wherein the required time comprises a total sum of times each required to execute a respective one of a plurality of commands included in the data and said deriving step derives the required time by referring to a table which stores execution times in correspondence with the respective commands.

4. A method according to claim 1, wherein the comparison result indicates whether the derived time lies within the predetermined time.

5. A method according to claim 1, further comprising the step of outputting the pattern in the resolution corresponding to the predetermined time if said determining step determines that the pattern can be output in that resolution.

6. A method according to claim 1, wherein the pattern is output to a memory.

7. A method according to claim 1, wherein the pattern is printed by a printer.

8. An output apparatus comprising:
   deriving means for deriving a time required to output a pattern based on data input;
   comparing means for comparing the derived time with a predetermined time; and
   determining means for determining, in response to a comparison result obtained by said comparing means, whether the pattern can be output in a resolution corresponding to the predetermined time.

9. An apparatus according to claim 8, wherein the data comprises a command for instructing drawing of a desired pattern.

10. An apparatus according to claim 8, wherein the required time comprises a total sum of times each required to execute a respective one of a plurality of commands included in the data and said deriving means derives the required time by referring to a table which stores execution times in correspondence with the respective commands.

11. An apparatus according to claim 8, wherein the comparison result indicates whether the derived time lies with the predetermined time.

12. An apparatus according to claim 8, further comprising output means for outputting the pattern in the resolution corresponding to the predetermined time if said determining means determines that the pattern can be output in that resolution.

13. An apparatus according to claim 8, wherein the pattern is output to a memory.

14. An apparatus according to claim 8, further comprising means for printing the pattern.

15. An output method, comprising the steps of:
    providing a pattern;
    deriving a plurality of time factors required to output the pattern, each time factor being derived in correspondence with a respective one of a plurality of output resolutions in response to data representing the pattern; and
    selecting one of the output resolutions for outputting the pattern in response to the plurality of derived time factors.

16. A method according to claim 15, wherein the data comprises a command for instructing drawing of a figure pattern.

17. A method according to claim 15, wherein the pattern is obtained by converting outline font data whose outline is represented by a coordinate point train into a dot point train.

18. A method according to claim 15, wherein the plurality of respective time factors are obtained from a table which stores time factors in correspondence with the plurality of output resolutions.

19. A method according to claim 15, wherein each of the plurality of respective time factors indicates a length of time required to output the pattern in plural stages.

20. A method according to claim 15, further comprising a step for inputting a command for setting the plurality of respective time factors.

21. A method according to claim 20, wherein the inputting step is executed by a host computer.

22. A method according to claim 20, wherein the inputting step is executed by an operator control panel.

23. A method according to claim 20, wherein the command indicates a length of time required to output the pattern in plural stages.

24. A method according to claim 15, wherein the plurality of time factors are derived in correspondence with a plurality of data representing the pattern.

25. A method according to claim 24, wherein an accumulated time factor which accumulates the plurality of time factors is derived in the deriving step.

26. A method according to claim 25, further comprising a step for storing the accumulated time factor.

27. A method according to claim 15, further comprising a step of storing the pattern to be outputted in units of a predetermined area.

28. A method according to claim 27, wherein the predetermined area is one page.

29. A method according to claim 15, further comprising a step of outputting the pattern in electrophotography, wherein the outputted pattern can be visualized.

30. A method according to claim 15, wherein the output resolution is determined for a pattern to be outputted in units of one or more pages in the determining step.

31. An output apparatus comprising:
    means for providing a pattern;
    means for deriving a plurality of time factors required to output the pattern, each time factor being derived in correspondence with a respective one of a plurality of output resolutions in response to data representing the pattern; and means for selecting one of the output resolutions for outputting the pattern in response to the plurality of derived time factors.

32. An apparatus according to claim 31, wherein the data comprises a command for instructing drawing of a figure pattern.

33. An apparatus according to claim 31, wherein the pattern is obtained by converting outline font data whose outline is represented by a coordinate point train into a dot point train.

34. An apparatus according to claim 31, wherein the plurality of respective time factors are obtained from a table which stores time factors in correspondence with the plurality of output resolutions.

35. An apparatus according to claim 31, wherein each of the plurality of respective time factors indicates the length of time required to output the pattern in plural stages.

36. An apparatus according to claim 31, further comprising means for inputting a command for setting the plurality of respective time factors.

37. An apparatus according to claim 36, wherein the inputting means is a host computer.

38. An apparatus according to claim 36, wherein the inputting means is an operator control panel.

39. An apparatus according to claim 36, wherein the command indicates a length of time required to output the pattern in plural stages.

40. An apparatus according to claim 27, wherein the plurality of time factors are derived in correspondence with a plurality of data representing the pattern in the deriving means.

41. An apparatus according to claim 40, wherein an accumulated time factor which accumulates the plurality of time factors is derived by the deriving means.

42. An apparatus according to claim 41, further comprising means for storing the accumulated time factor.

43. An apparatus according to claim 31, further comprising means for storing the pattern to be outputted in units of a predetermined area.

44. An apparatus according to claim 43, wherein the predetermined area is one page.

45. An apparatus according to claim 31, further comprising means for outputting the pattern in electrophotography, wherein the outputted pattern can be visualized.

46. An apparatus according to claim 31, wherein the output resolution is determined for a pattern to be outputted in units of one page or more pages by the determining means.

47. A drawing method comprising the steps of:
deriving a time required to draw a pattern in a memory based on data input;
determining, based on the derived time, whether the pattern can be drawn in the memory in a first resolution in a predetermined time; and
drawing the pattern in the memory in the first resolution if said determining step determines that the pattern can be drawn in the first resolution.

48. A method according to claim 47, wherein the first resolution is a high resolution.

49. A method according to claim 47, wherein the pattern drawn in the memory is printed by a printer.

50. A method according to claim 47, wherein the pattern is drawn in the memory in a second resolution if said determining step determines that the pattern cannot be drawn in the first resolution.

51. A method according to claim 50, the second resolution is a low resolution.

52. A printing apparatus comprising:
means for deriving a time required to draw a pattern in a memory based on data input;
means for determining, based on the derived time, whether the pattern can be drawn in the memory in a first resolution in a predetermined time;
means for drawing the pattern in the memory in the first resolution if said determining means determines that the pattern can be drawn in the first resolution; and
means for printing the pattern drawn in the memory.

53. A method according to claim 52, wherein the first resolution is a high resolution.

54. A method according to claim 52, wherein the pattern is drawn in the memory in a second resolution if said determining means determines that the pattern cannot be drawn in the first resolution.

55. A method according to claim 54, the second resolution is a low resolution.

* * * * *

UNITED STATES PATENT AND TRADEMARK OFFICE
CERTIFICATE OF CORRECTION

PATENT NO. : 5,406,383
DATED : April 11, 1995
INVENTOR(S) : FUMIHIRO TANAKA It is certified that error appears in the above-identified patent and that said Letters Patent is hereby corrected as shown below:

COLUMN 4

Line 25, "to" should read --between--.

COLUMN 7

Line 29, "claim 27," should read --claim 31,--.

COLUMN 8

Line 24, "the" should read --wherein the--.
Line 43, "the" should read --wherein the--.

Signed and Sealed this

Eleventh Day of July, 1995

Attest:

BRUCE LEHMAN

*Attesting Officer*       *Commissioner of Patents and Trademarks*